(12) United States Patent
Sugamura et al.

(10) Patent No.: US 9,310,196 B2
(45) Date of Patent: Apr. 12, 2016

(54) DISPLACEMENT DETECTING DEVICE

(71) Applicant: Transtron Inc., Yokohama (JP)

(72) Inventors: Nobuo Sugamura, Ayase (JP); Yasukazu Komatsu, Sagamihara (JP)

(73) Assignee: TRANSTRON INC., Yokohama (JP)

( * ) Notice: Subject to any disclaimer, the term of this patent is extended or adjusted under 35 U.S.C. 154(b) by 126 days.

(21) Appl. No.: 14/023,915

(22) Filed: Sep. 11, 2013

(65) Prior Publication Data

US 2014/0157609 A1    Jun. 12, 2014

(30) Foreign Application Priority Data

Dec. 7, 2012   (JP) ................................. 2012-268752

(51) Int. Cl.
G01B 5/24    (2006.01)
G01B 21/22   (2006.01)

(52) U.S. Cl.
CPC ...................................... *G01B 21/22* (2013.01)

(58) Field of Classification Search
CPC .............. G01B 3/56; G01B 5/24; G01B 7/20; G01B 21/22
USPC .......... 22/1 N, 1 PT, 333, 335, 343, 534, 600, 22/613, 645
See application file for complete search history.

(56) References Cited

U.S. PATENT DOCUMENTS

| | | | | |
|---|---|---|---|---|
| 4,977,811 A * | 12/1990 | Suzuki et al. | .................... | 84/600 |
| 5,033,202 A * | 7/1991 | Chen | .............................. | 33/768 |
| 5,263,492 A * | 11/1993 | Voyce | ........................... | 600/595 |
| 5,529,296 A * | 6/1996 | Kato et al. | ..................... | 267/155 |
| 5,829,148 A * | 11/1998 | Eaton | ............................... | 33/503 |
| 6,327,906 B1 * | 12/2001 | Abe | ................................ | 73/488 |
| 6,668,466 B1 * | 12/2003 | Bieg et al. | ....................... | 33/503 |
| 7,481,004 B2 * | 1/2009 | Krohmer et al. | ................ | 33/645 |
| 8,191,269 B1 * | 6/2012 | Hernandez et al. | .......... | 33/27.02 |
| 2001/0034951 A1 * | 11/2001 | Sears | .............................. | 33/640 |
| 2003/0177656 A1 * | 9/2003 | Sawdon | ......................... | 33/645 |
| 2004/0259687 A1 * | 12/2004 | Ritter et al. | .................... | 477/187 |
| 2007/0157477 A1 * | 7/2007 | Sellien | .......................... | 33/1 PT |
| 2011/0025314 A1 * | 2/2011 | Matsushima et al. | ..... | 324/207.25 |
| 2014/0101949 A1 * | 4/2014 | You-Hong | ...................... | 33/343 |
| 2014/0173873 A1 * | 6/2014 | Butterfield, IV | ................ | 33/645 |
| 2015/0035256 A1 * | 2/2015 | Klank et al. | .................. | 280/513 |
| 2015/0061654 A1 * | 3/2015 | Onodera et al. | ......... | 324/207.21 |

FOREIGN PATENT DOCUMENTS

JP    2006-306177    11/2006

OTHER PUBLICATIONS

Patent Abstracts of Japan, Publication No. 2006-306177, Published Nov. 9, 2006.

* cited by examiner

*Primary Examiner* — G. Bradley Bennett
(74) *Attorney, Agent, or Firm* — Staas & Halsey LLP

(57) ABSTRACT

A displacement detection device is for detecting a change amount of relative positions of two parts as an angle displacement amount. The displacement detection device includes a link mechanism configured to connect the two parts, the link mechanism including at least one joint part; and a rotation angle detector connected to one end of the link mechanism. A spring is used as the at least one joint part of the link mechanism.

6 Claims, 7 Drawing Sheets

DISPLACEMENT DETECTING DEVICE

CROSS-REFERENCE TO RELATED APPLICATION

This patent application is based upon and claims the benefit of priority of the prior Japanese Patent Application No. 2012-268752 filed on Dec. 7, 2012, the entire contents of which are incorporated herein by reference.

FIELD

The embodiments discussed herein are related to a displacement detection device for detecting the relative displacement between two parts constituting a single mechanical device such as a vehicle.

BACKGROUND

For example, there are cases of detecting the relative displacement between two parts constituting a single mechanical device such as a vehicle, and controlling functions of the vehicle based on the detection value. For example, in order to realize an auto-leveling function of headlights of a vehicle, a displacement detection device is attached to the vehicle body. Specifically, the displacement of a rear-wheel axle with respect to the part of the vehicle body where the headlights are attached is detected, and auto-leveling of the headlights is performed based on the displacement detection value. Auto-leveling is a function of adjusting the light axis direction of headlights, so that the light axis of the headlights is not directed upward more than a prescribed range, when the rear-wheel axle enters into the vehicle body.

As an example of functions installed in a vehicle such as an automobile, other than the above-described auto-leveling function, there is a function of detecting the displacement of an object with a displacement detection device and controlling the displacement. Another example is to detect the stroke (displacement) of the brake pedal, and to use the detection value to control the brakes.

For example, a displacement detection device includes a link mechanism having a detection object part fixed to an object whose displacement is to be detected and a fixed part fixed to a part of the mechanical device, and an angle detector for detecting the displacement of the link mechanism as angle displacement. When the detection object part of the link mechanism becomes displaced with respect to the fixed part, the fixed part at one end of the link mechanism rotates according to the displacement. By detecting this rotation angle with the angle detector, the displacement of the detection object part fixed to the displacement detection object is detected.
Patent document 1: Japanese Laid-Open Patent Publication No. 2006-306177

In the above displacement detection device, a ball joint is often used at the joint part between the levers of the link mechanism. By using a ball joint rotatable in three axial directions, it is possible to cancel out the displacement in directions other than the direction parallel to the plane including the rotation direction of the lever.

However, a ball joint is a relatively expensive part, and by using a ball joint, the manufacturing cost of the displacement detection device increases. Furthermore, a ball joint is attached to the lever of the link mechanism with the use of a fixing mechanism such as a bolt and a nut. Thus, the assembling man-hours for the displacement detection device increase, which increases the manufacturing cost of the displacement detection device accordingly.

SUMMARY

According to an aspect of the embodiments, a displacement detection device for detecting a change amount of relative positions of two parts as an angle displacement amount is provided, the displacement detection device including a link mechanism configured to connect the two parts, the link mechanism including at least one joint part; and a rotation angle detector connected to one end of the link mechanism, wherein a spring is used as the at least one joint part of the link mechanism.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DESCRIPTION OF EMBODIMENTS

Preferred embodiments of the present invention will be explained with reference to accompanying drawings.

Figure 1:
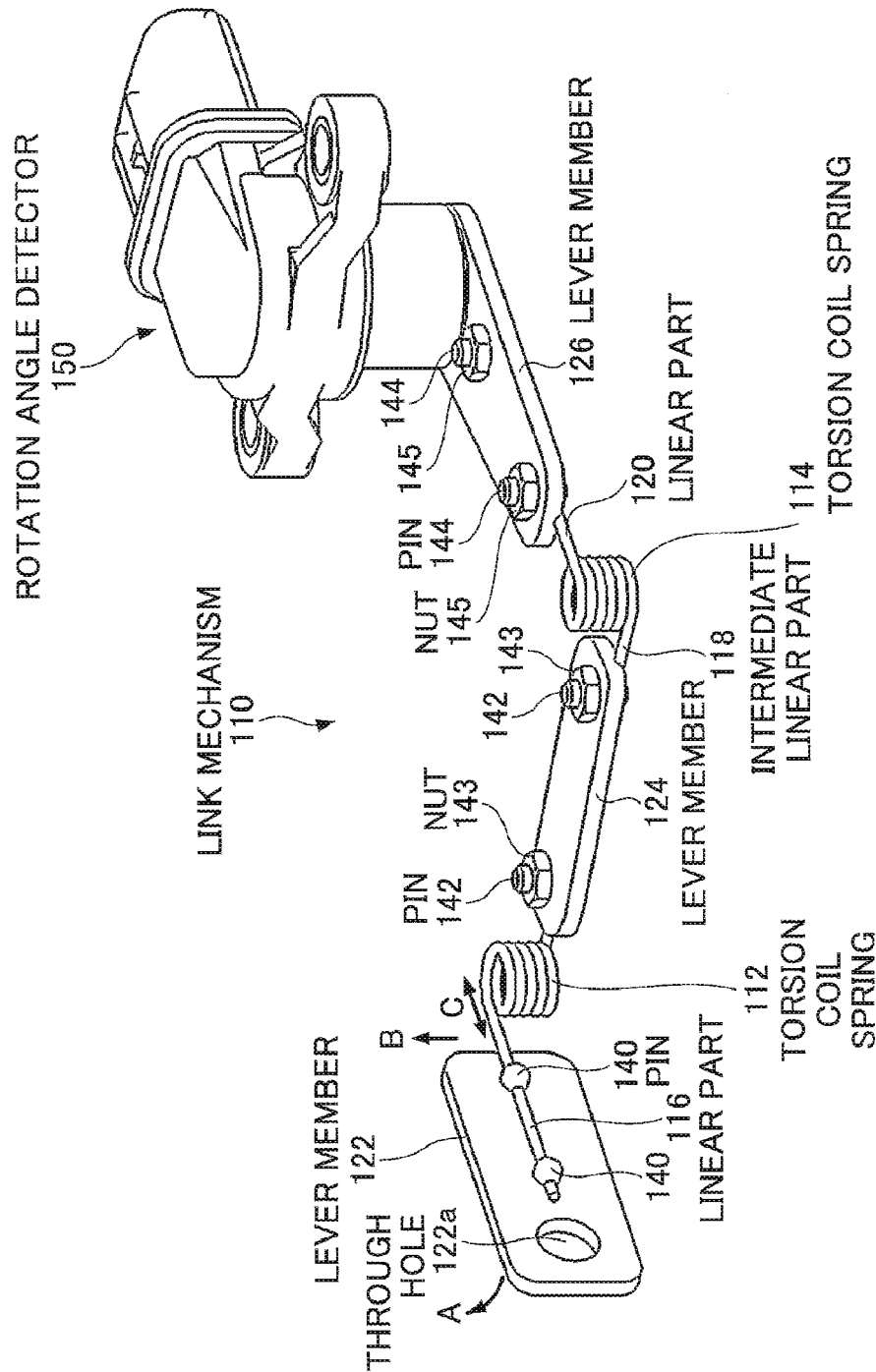
FIG. 1 is a perspective view of a displacement detection device according to a first embodiment.
Figure 2:
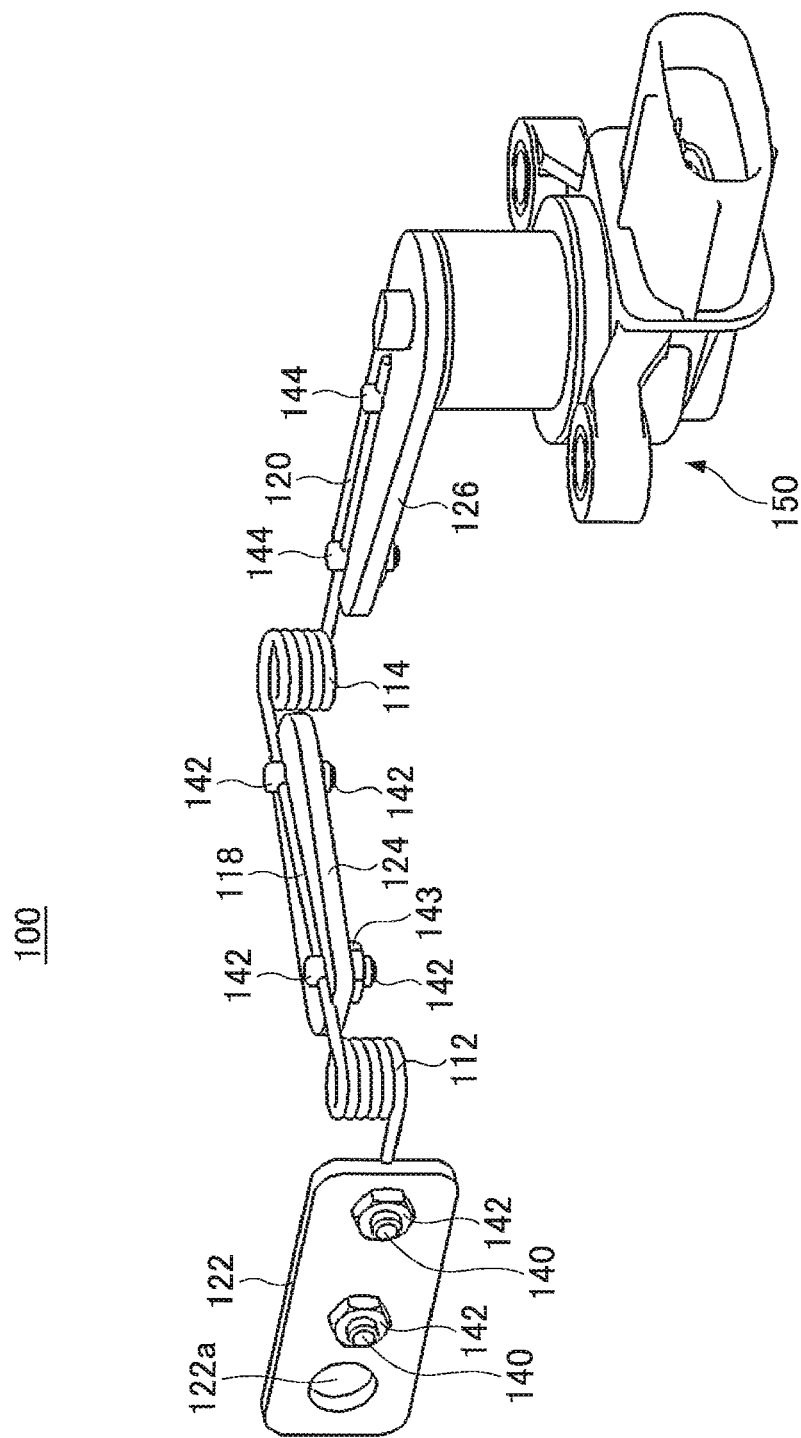
FIG. 2 is a perspective view of the displacement detection device according to the first embodiment viewed from a side opposite to that of FIG. 1.

FIG. 1 is a perspective view of a displacement detection device 100 according to a first embodiment. FIG. 2 is a perspective view of the displacement detection device 100 according to the first embodiment viewed from a side opposite to that of FIG. 1.

The displacement detection device 100 according to the first embodiment includes a link mechanism 110 and a rotation angle detector 150 attached to one end of the link mechanism 110.

The link mechanism 110 according to the present embodiment is a two-joint type link mechanism having two joint parts. Each joint part is formed only with a single spring. More specifically, the two joint parts are formed with torsion coil springs 112, 114, respectively. The two torsion coil springs 112, 114 are formed by a single spring member, and the two torsion coil springs 112, 114 are linked by the spring member, forming a single body. As the spring member, for example, a metal wire may be used, such as a carbon steel spring member and a stainless steel spring member (SUS304WPB). The cross-sectional shape of the metal wire may be a circle, or a polygon such as a square or a hexagon.

One end of the torsion coil spring 112 is formed as linear part 116 where the spring member extends in a linear manner. The other end of the torsion coil spring 112 is formed as an intermediate linear part 118 where the spring member extends in a linear manner. The intermediate linear part 118 is linked to the torsion coil spring 114, and the part between the torsion coil springs 112, 114 corresponds to the intermediate linear part 118. Therefore, the intermediate linear part 118 is one end of the torsion coil spring 114. The other end of the torsion coil spring 114 is formed as a linear part 120 where the spring member extends in a linear manner.

As described above, the linear part 116, the torsion coil spring 112, the intermediate linear part 118, the torsion coil spring 114, and the linear part 120 are formed as a single body by processing a single spring member. The linear part 116, the intermediate linear part 118, and the linear part 120 correspond to the arm or the lever of the link mechanism 110, which are reinforced by a reinforcement member as described below so as to become rigid. The torsion coil springs 112, 114 correspond to the joint parts of the link mechanism 110. The linear part 116, the intermediate linear part 118, and the linear part 120 may be rotated/displaced centering around the torsion coil springs 112, 114.

The linear part 116, which is one end of the torsion coil spring 112, is fixed to a lever member 122 that is a detection object connection part. The lever member 122 is formed of, for example, a rigid material such as a resin plate and a metal plate, and has a role of reinforcing the linear part 116 so that the linear part 116 does not deform.

There are various methods of fixing the linear part 116 to the lever member 122. In the present embodiment, a pin 140 having a hole through which the spring member may pass, is used. On one end of the pin 140, a screw part is formed, and at the leading end of the pin 140, a hole through which the spring member may pass is formed in a direction perpendicular to the axis of the pin 140. The leading end of the pin 140 is inserted into a hole of the lever member 122 from the back side of the lever member 122 so that the leading end of the pin 140 sticks out on the front side of the lever member 122. In a state where the linear part 116 is inserted in the hole of the pin 140 sticking out on the front side of the lever member 122, a nut 141 is engaged with the screw part of the pin 140, and the nut 141 is tightened. Accordingly, the pin 140 is pulled toward the back side of the lever member 122, and the linear part 116 is pushed against the front side of the lever member 122 and fixed. In the present embodiment, the pin 140 is provided at two locations; however, the pin 140 may be provided at three or more locations along the linear part 116.

Furthermore, a through hole 122a is formed in the lever member 122, and the lever member 122 may be screwed to the displacement detection object by using the through hole 122a. Therefore, the lever member 122 also has a role as a connection part for fixing one end of the link mechanism 110 to the displacement detection object. Thus, the lever member 122 to which the linear part 116 is fixed corresponds to a detection object connection part that is a part where the link mechanism 110 is connected to the displacement detection object.

Meanwhile, the intermediate linear part 118 extending between the torsion coil spring 112 and the torsion coil spring 114 is fixed to a lever member 124 acting as a reinforcement part. The lever member 124 is formed with, for example, a rigid material such as a resin plate and a metal plate, and has a role of reinforcing the intermediate linear part 118 so that the intermediate linear part 118 does not deform.

The intermediate linear part 118 is fixed to the lever member 124 by using pins 142 and nuts 143, by the same fixing method as that of the linear part 116. The lever member 124 to which the intermediate linear part 118 is fixed corresponds to an intermediate connection part which is the part linking the torsion coil spring 112 and the torsion coil spring 114.

Furthermore, the linear part 120, which corresponds to one end of the torsion coil spring 114, is fixed to a lever member 126 acting as a detector connection part. The lever member 126 is formed of, for example, a rigid material such as a resin plate and a metal plate, and has a role of reinforcing the linear part 120 so that the linear part 120 does not deform.

The linear part 120 is fixed to the lever member 126 by using pins 144 and nuts 145, by the same fixing method as that of the linear part 116. The lever member 126 to which the intermediate linear part 120 is fixed corresponds to a detector connection part which is the part connecting one end of the link mechanism 110 to the rotation angle detector 150.

Figure 3:
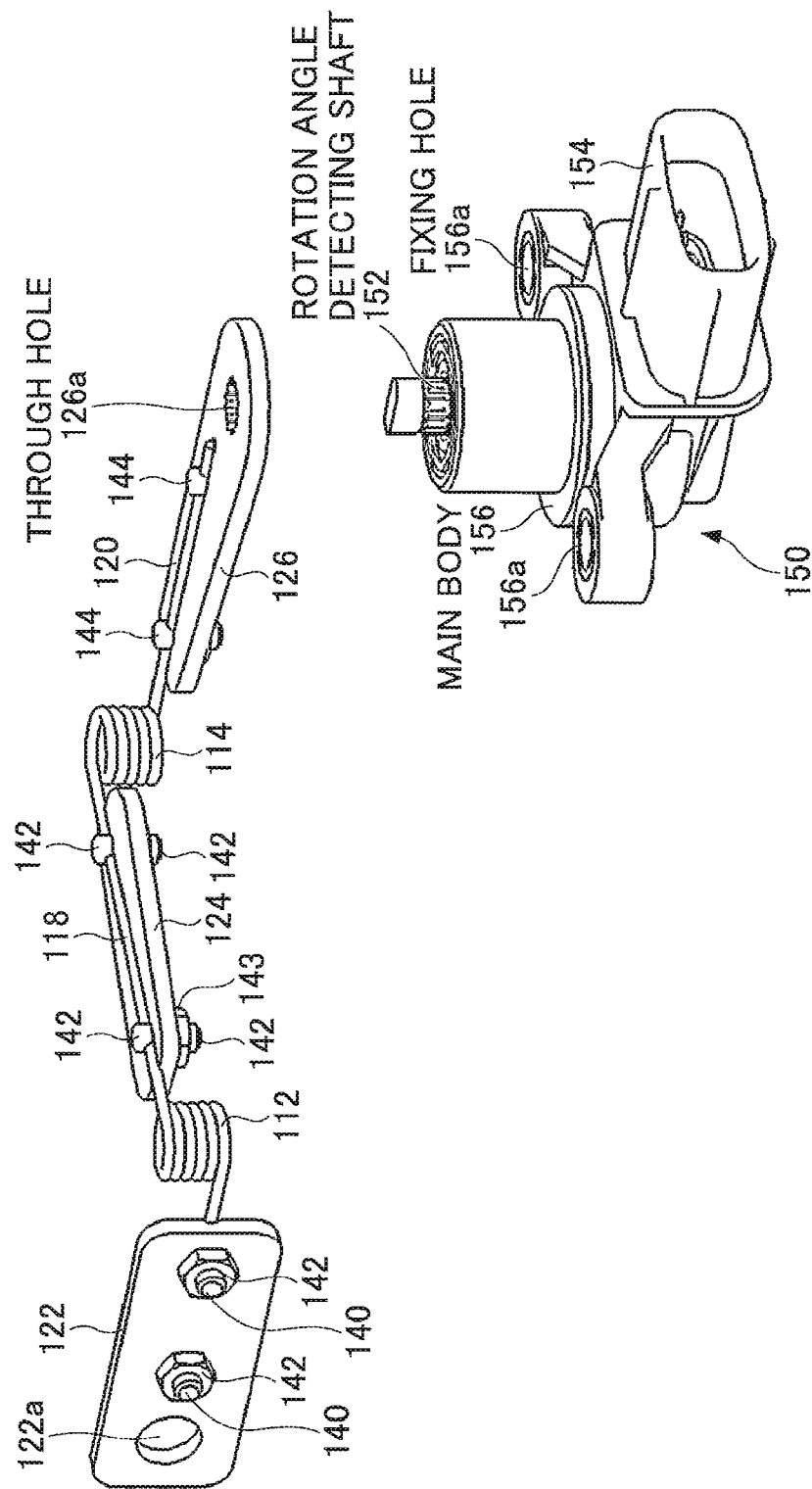
FIG. 3 is a perspective view of the displacement detection device according to the first embodiment in a state where a rotation angle detector is removed.

FIG. 3 is a perspective view of the displacement detection device 100 in a state where the lever member 126 is removed from the rotation angle detector 150. On one end of the lever member 126, a through hole 126a is formed, which has a plurality of grooves formed on the inner side. A rotation angle detecting shaft 152 of the rotation angle detector 150 is inserted in the through hole 126a of the lever member 126 and fixed. On the outer peripheral side of the rotation angle detecting shaft 152, a plurality of strip-shaped projections are formed, which correspond to the grooves on the inner side of the lever member 126. As the projections of the rotation angle detecting shaft 152 are fit to the grooves of the through hole 126a (so called spline connection), the through hole 126a of the lever member 126 is engaged with the rotation angle detecting shaft 152 without sliding. Accordingly, the rotation/displacement of the lever member 126 is reliably transmitted to the rotation angle detecting shaft 152.

The rotation angle detector 150 is, for example, a compact rotary encoder, and may be any type of encoder such as a magnetic encoder or an optical encoder. When the rotation angle detecting shaft 152 of the rotation angle detector 150 rotates, an electric signal corresponding to the rotation angle is output from a connector part 154. The resolution and the properties of the rotation angle detector 150 may be determined to fit the purpose of the displacement detection device 100.

A main body 156 of the rotation angle detector 150 has fixing holes 156a. The rotation angle detector 150 is fixed to a fixed part (a part that is fixed and is not displaced with respect to the displacement detection object) with the use of the fixing holes 156a, by being screwed to the fixed part.

As described above, the configuration of the link mechanism 110 has a simple structure, in which the lever members 122, 124, and 126 are fixed to linear parts of a spring member including the torsion coil springs 112, 114 to reinforce the linear parts, and is thus manufactured at low cost. Each of the torsion coil springs 112, 114 functioning as joint parts may be deformed in the coil winding direction, and therefore provides a function of a joint part in which both ends of the coil may be rotated/displaced around the coil. In addition, both ends of the coil may be displaced in other directions, and when the ends of the coil are displaced in a direction other than the coil winding direction, the displacement may be cancelled out. Accordingly, the torsion coil springs 112, 114 provide a joint function similar to a joint part using, for example, a ball joint.

As one example, a description is given of the displacement of the torsion coil spring 112 functioning as a joint part and the linear part 116 (lever member 122) extending from one end of the torsion coil spring 112. The linear part 116 is rotatable in the winding direction of the torsion coil spring 112. The winding direction of the torsion coil spring 112 matches the rotation direction of the rotation angle detecting shaft 152 of the rotation angle detector 150. Therefore, when the linear part 116 (lever member 122) rotates in the winding direction (an A direction in FIG. 1) of the torsion coil spring 112, the rotation is transmitted to the rotation angle detecting shaft 152 of the rotation angle detector 150 via the link mechanism 110. However, when the linear part 116 (lever member 122) is rotated in the winding direction of the torsion coil spring 112, the torsion coil spring 112 slightly bends in the winding direction, and the rotation amount is reduced corresponding to the bend, and the reduced rotation amount is transmitted to the rotation angle detecting shaft 152. Therefore, in consideration of the bending amount of the torsion coil spring 112 in the winding direction, the displacement amount (rotation angle) of the linear part 116 (lever member 122) is to be detected.

The displacement direction of the linear part 116 (lever member 122) is not limited to the A direction. Depending on the displacement of the detection object, the linear part 116 (lever member 122) may be slightly displaced in a direction that is not parallel to a plane including the A direction (for example, a B direction perpendicular to the plane including the A direction), or may be slightly displaced in the direction in which the linear part 116 extends (C direction). However, even in these cases, as the coil part of the torsion coil spring 112 deforms, the displacement in the B direction and the C direction is cancelled out, thereby realizing the link mechanism 110 having flexibility in the displacement direction.

The winding part (part where the wire is wound) of the coil part of the torsion coil spring 112 may constantly deform according to the displacement of the linear part 116. Therefore, the coil part is preferably not wound in a cohesive manner; the coil part is preferably wound in a slightly separated manner (the wire is wound with slight gaps therebetween), so that friction is not generated.

For example, the displacement detection device 100 described above is attached to part of a vehicle, to realize an auto-leveling function for headlights of a vehicle. In this case, the detection object for which a displacement is to be detected, is the rear-wheel axle of the vehicle, and the displacement detection device 100 is connected and fixed to a part where the lever member 122 (detection object connection part) moves together with the movement of the rear-wheel axle, such as a part in which the bearing of the rear-wheel axle is installed. Meanwhile, the rotation angle detector 150 that is the fixed side is connected and fixed to a part of the vehicle body close to the rear-wheel axle. Accordingly, for example, the displacement detection device 100 may detect a displacement (inclined angle) of the vehicle body in a case where the rear-wheel axle enters into the vehicle body because a heavy object is placed in the rear part of the vehicle.

Another purpose in a vehicle is to implement control based on the operation amount of the brake pedal. In this case, for example, the detection object for which a displacement is to be detected is the rod of the brake cylinder, and the lever member 122 that is the detection object connection part is connected and fixed to the rod of the brake cylinder. Meanwhile, the rotation angle detector 150 that is the fixed side is connected and fixed to the part of the vehicle body close to the brake cylinder. Accordingly, the displacement detection device 100 may detect the displacement of the rod of the brake cylinder corresponding to the displacement of the brake pedal.

Figure 4:
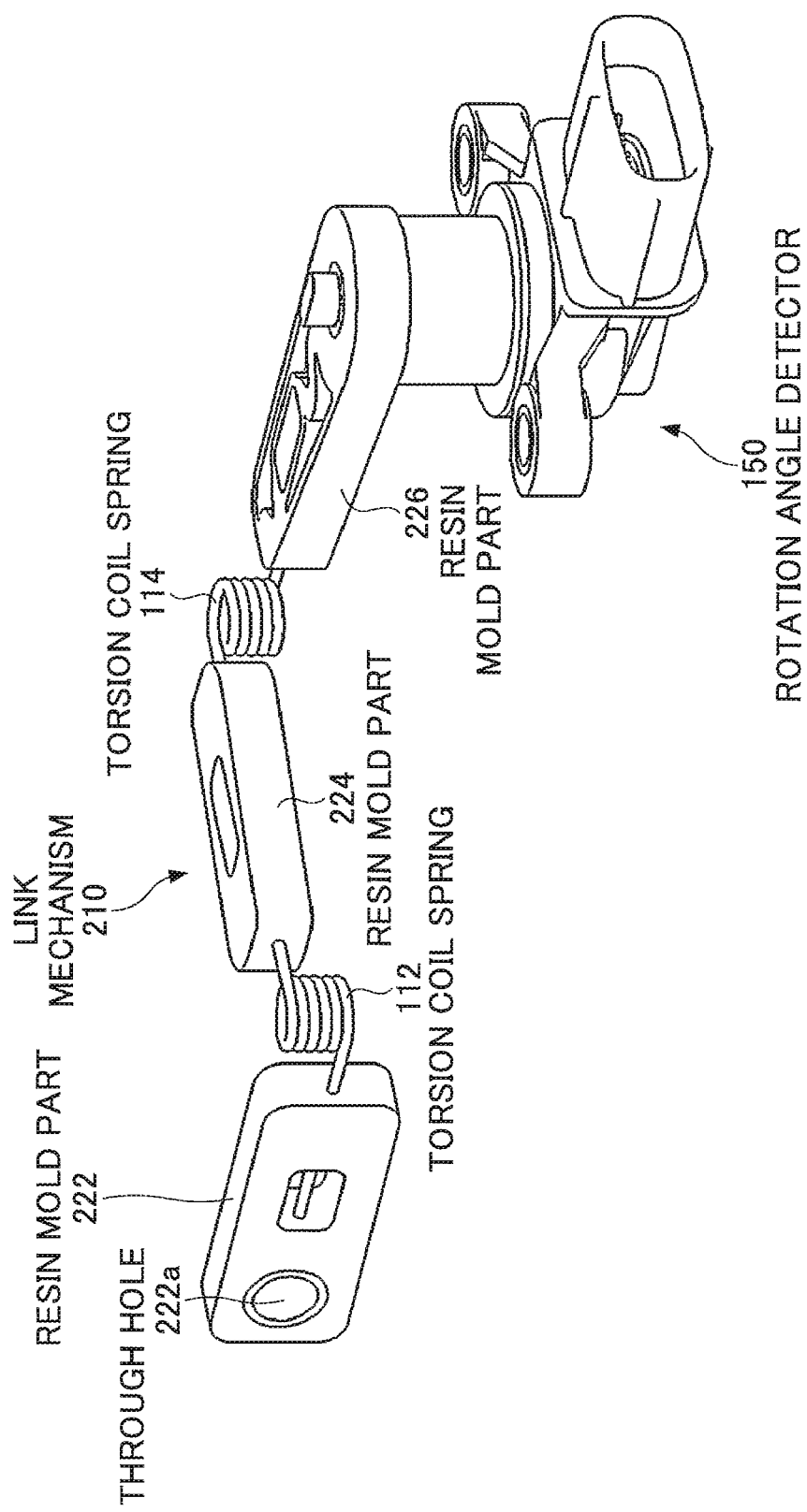
FIG. 4 is a perspective view of a displacement detection device according to a second embodiment.
Figure 5:
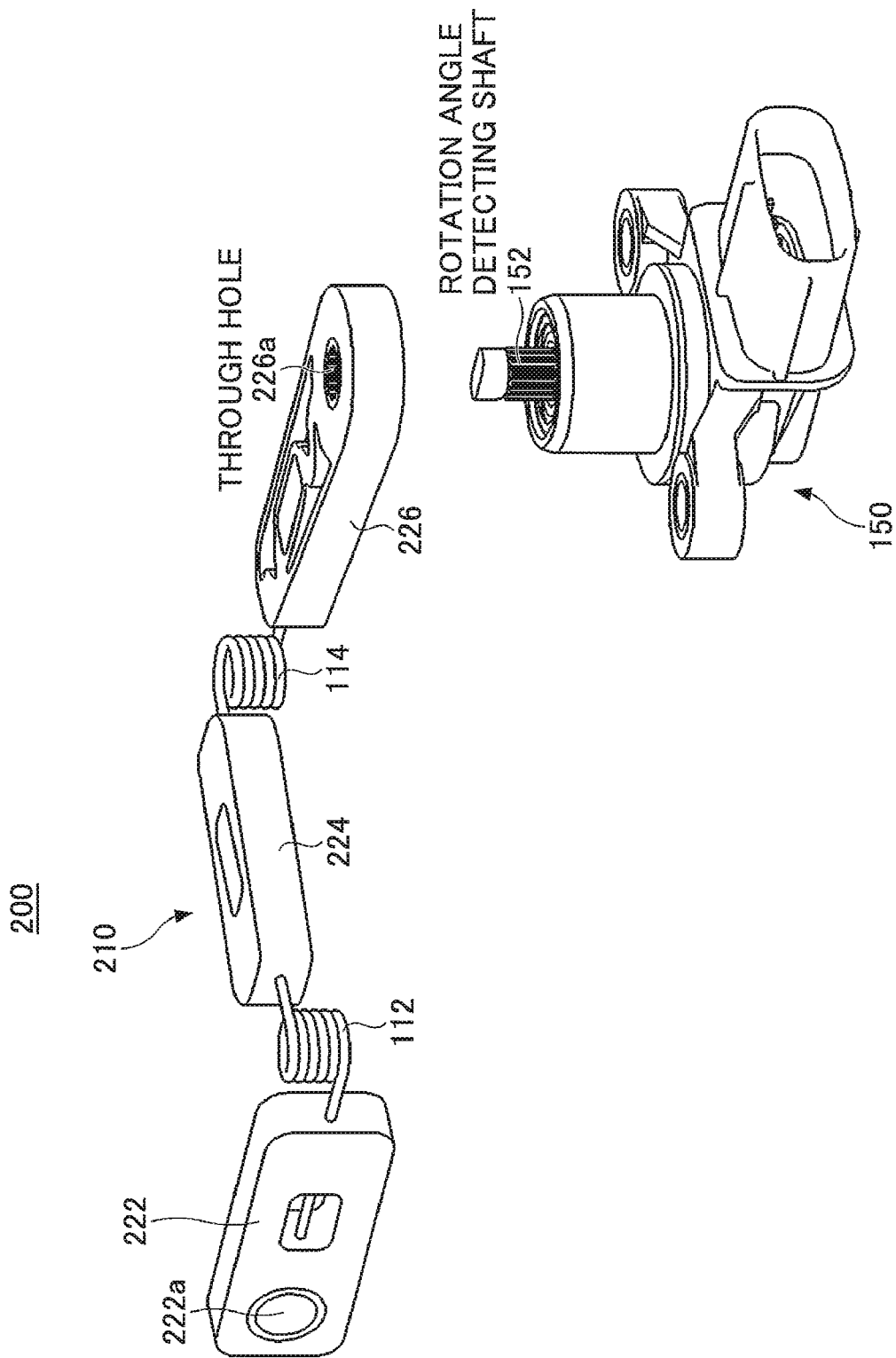
FIG. 5 is a perspective view of the displacement detection device according to the second embodiment in a state where a rotation angle detector is removed.

Next, a description is given of a displacement detection device 200 according to a second embodiment, with reference to FIGS. 4 and 5. FIG. 4 is a perspective view of the displacement detection device 200 according to the second embodiment. FIG. 5 is a perspective view of the displacement detection device 200 in a state where the rotation angle detector 150 is removed. In FIGS. 4 and 5, elements corresponding to those in FIG. 1 are denoted by the same reference numerals and descriptions thereof are omitted.

In the second embodiment, instead of reinforcing the linear parts 116, 118, 120 of the spring member by attaching lever members 122, 124, 126 as in the first embodiment, resin mold parts 222, 224, 226 are formed at the linear parts 116, 118, 120, respectively. The resin mold parts 222, 224, 226 are molded at the same time, by performing insert molding on the spring member in which the torsion coil springs 112, 114 are formed.

Specifically, the resin mold part 222 is insert-molded along the linear part 116. In the resin mold part 222, a through hole 222a is formed, which is used as a screw through hole for connecting/fixing the resin mold part 222 to the detection object. Furthermore, the resin mold part 224 is insert-molded along the intermediate linear part 118. The resin mold part 224 is not fixed to anything, and therefore a through hole for fixing is not formed. Furthermore, the resin mold part 226 is insert-molded along the linear part 120. In the resin mold part 226, a through hole 226a is formed, which is engaged with the rotation angle detecting shaft 152 of the rotation angle detector 150.

In the resin mold parts 222, 224, 226, recessed parts and pass-through parts are formed, for reducing the weight of the resin mold parts and improving molding properties (preventing drawing of resin). However, these recessed parts and pass-through parts are unrelated to the function of the displacement detection device 200.

Furthermore, the linear parts 116, 118, 120 embedded in the resin mold parts 222, 224, 226 may have a shape other than a linear shape. From the view point of insert molding, the linear parts 116, 118, 120 are preferably curved or meandered in the parts where they are embedded in the resin mold parts 222, 224, 226.

The displacement detection device 200 according to the second embodiment provides the same effects as the displacement detection device 100 according to the first embodiment, and may be used for the same purposes as the displacement detection device 100 according to the first embodiment. Furthermore, in the displacement detection device 200 according to the second embodiment, insert molding is performed on the spring member, and therefore the entire link mechanism 110 is formed as a single part. Accordingly, the assembling man-hours for the displacement detection device 200 are reduced, and the manufacturing cost is reduced.

Figure 6:
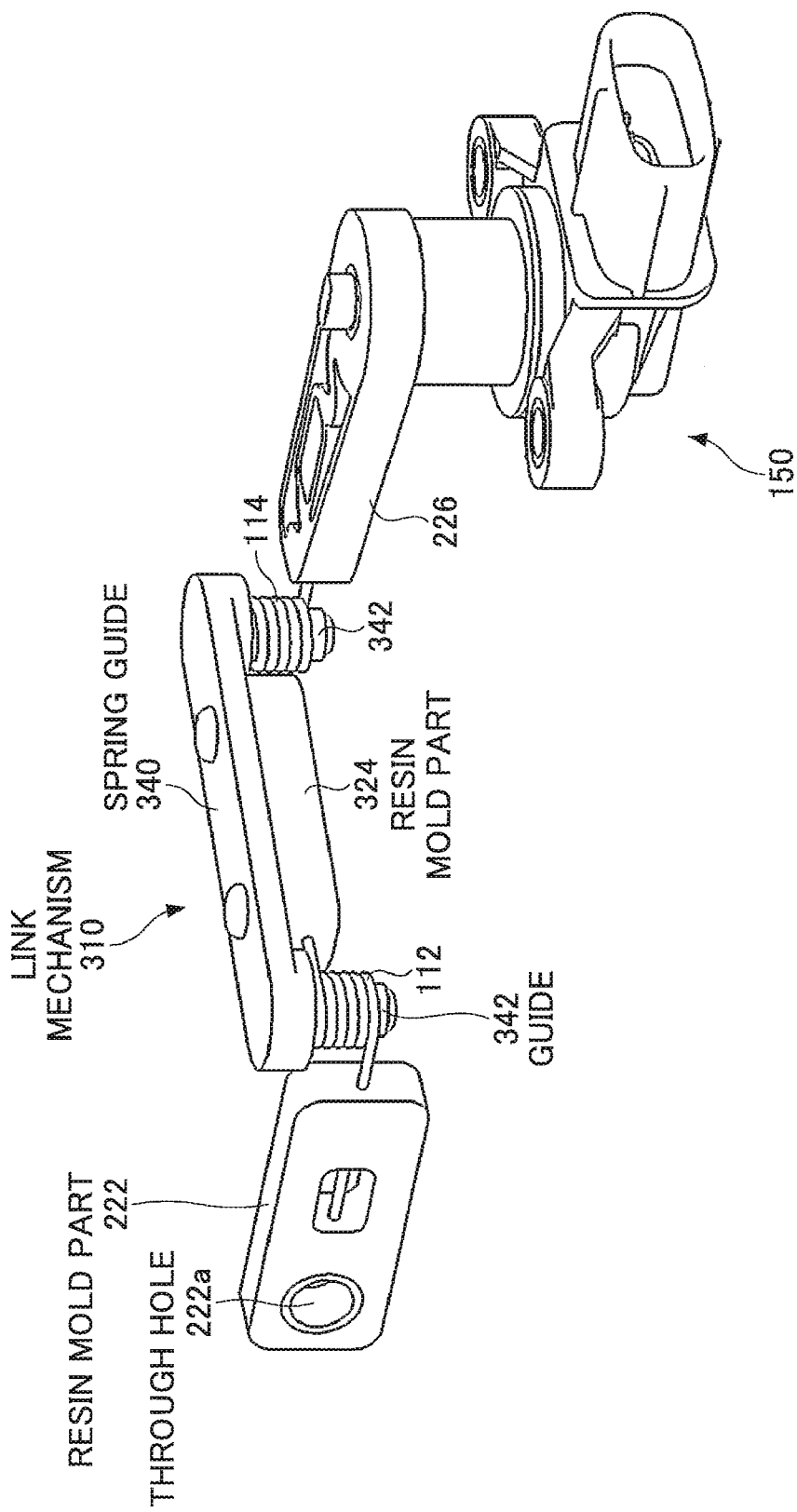
FIG. 6 is a perspective view of a displacement detection device according to a third embodiment.
Figure 7:
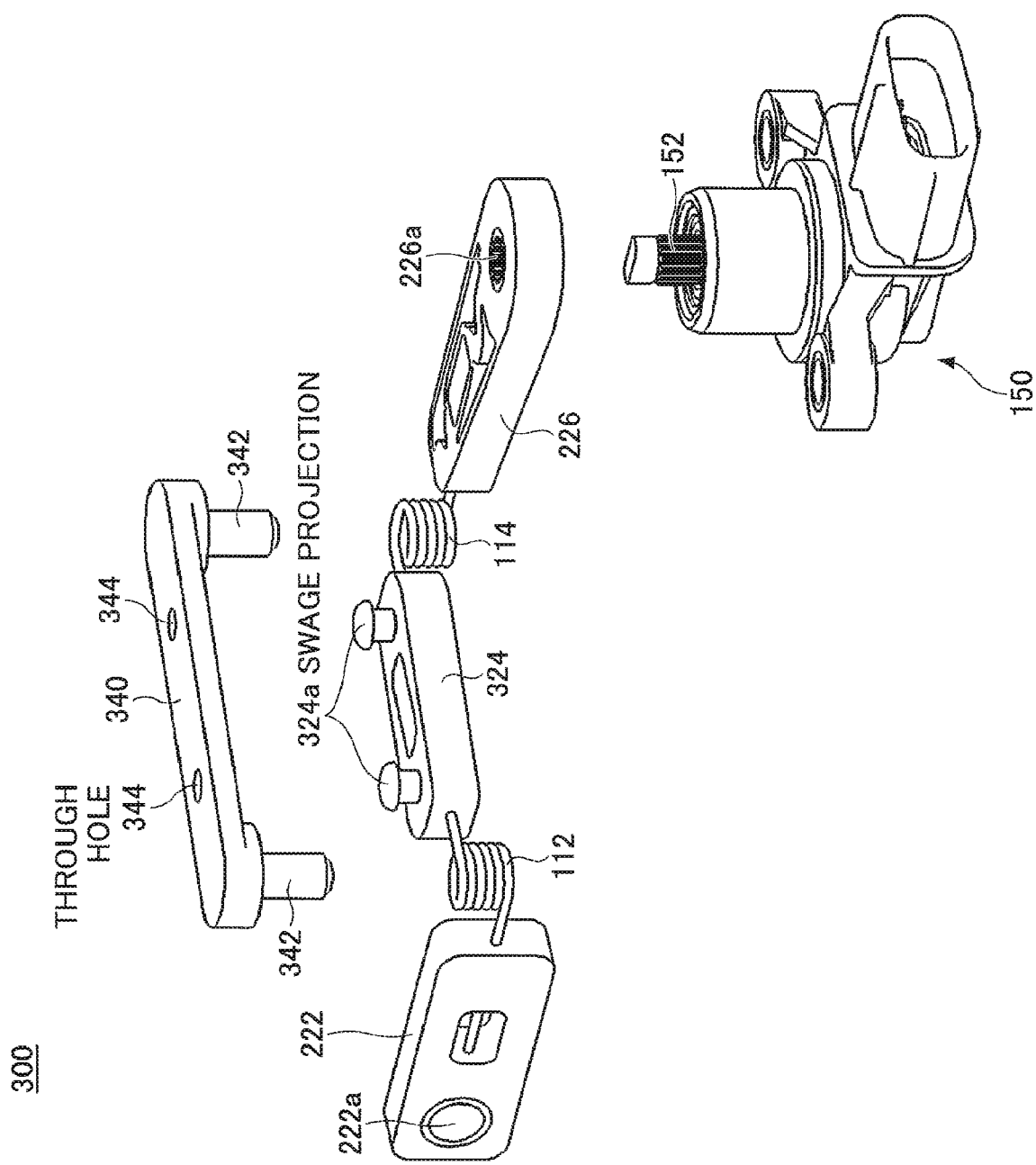
FIG. 7 is a perspective view of the displacement detection device according to the third embodiment in a state where the rotation angle detector and a spring guide are removed.

Next, a description is given of a displacement detection device 300 according to a third embodiment, with reference to FIGS. 6 and 7. FIG. 6 is a perspective view of the displacement detection device 300 according to the third embodiment. FIG. 7 is a perspective view of the displacement detection device 300 in a state where the rotation angle detector 150 and a spring guide described below are removed. In FIGS. 6 and 7, elements corresponding to those in FIGS. 1 and 5 are denoted by the same reference numerals and descriptions thereof are omitted.

In the third embodiment, a spring guide 340 is attached to a resin mold part 324 in which the intermediate linear part 118 is to be embedded. The spring guide 340 has guides 342 projecting perpendicularly from both ends of the spring guide 340 in the longitudinal direction. When the spring guide 340 is attached to the resin mold part 324, the guides 342 are inserted inside the coil parts of the torsion coil springs 112, 114. The outer diameter of the guide 342 is slightly smaller than the inner diameter of the coil part of the torsion coil springs 112, 114.

The spring guide 340 is attached to the resin mold part 324 by inserting swage projections 324a of the resin mold part 324 in through holes 344 of the spring guide 340, and heat-swaging the leading end of each swage projection 324a. The swage projection 324a may be molded to form a single body with the resin mold part 324, and therefore the spring guide 340 may be attached to the resin mold part 324 at low cost without increasing the number of parts.

As described above, by fitting the guides 342 inside the torsion coil springs 112, 114, the distance between the torsion coil springs 112, 114 is fixed to the distance between the two guides 342, and therefore the relative positional relationship between the torsion coil springs 112, 114 is maintained at a fixed relationship. Furthermore, when the torsion coil springs 112, 114 deform, the deforming direction is limited by the guides 342, and therefore the central axis of the coil part of the torsion coil springs 112, 114 is prevented from falling or curving. Accordingly, the positional relationship between the rotation axes of the torsion coil springs 112, 114 acting as joint parts is maintained at a fixed relationship, and even when a force is applied to the joint part in a direction other than the rotation direction, the central axis of the joint part is not deviated, and therefore the displacement of the of a link mechanism 310 is reliable.

According to an aspect of the embodiments, a spring is used as the joint part of the link mechanism, and therefore the structure of the link mechanism is simplified and a displacement detection device is provided at low cost.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A displacement detection device for detecting a change amount of relative positions of two parts as an angle displacement amount, the displacement detection device comprising:
    a link mechanism configured to connect the two parts, the link mechanism including at least one joint part; and
    a rotation angle detector connected to one end of the link mechanism, wherein
    a spring is used as the at least one joint part of the link mechanism,
    the spring is a torsion coil spring,
    the link mechanism includes two of the torsion coil springs,
    the link mechanism includes
    an intermediate connection part configured to connect the two of the torsion coil springs,
    a detector connection part extending from one of the two of the torsion coil springs, and
    a detection object connection part extending from another one of the two of the torsion coil springs, and
    the two of the torsion coil springs are formed by processing a single metal wire.

2. The displacement detection device according to claim 1, wherein
    a wire winding part of each of the two of the torsion coil springs is wound in a separated manner.

3. The displacement detection device according to claim 1, wherein
    the intermediate connection part, the detector connection part, and the detection object connection part included in the link mechanism are formed by being covered by a resin material at parts other than parts of the metal wire forming the two of the torsion coil springs.

4. The displacement detection device according to claim 3, wherein
    the link mechanism is formed by insert molding the metal wire in which the two of the torsion coil springs are formed.

5. The displacement detection device according to claim 1, further comprising:
    a spring support member extending along the intermediate connection part,
    wherein the spring support member includes guide members configured to fit into coil parts of the two of the torsion coil springs.

6. The displacement detection device according to claim 5, wherein
    the spring support member is fixed to the intermediate connection part,
    one of the guide members projects, from one end of the spring support member, in a direction perpendicular to a direction in which the intermediate connection part extends, and
    another one of the guide members projects, from another end of the spring support member, in a same direction as the direction in which the one of the guide members projects.

* * * * *